United States Patent [19]

Guzman et al.

[11] Patent Number: 5,377,052
[45] Date of Patent: Dec. 27, 1994

[54] ACTUATOR ASSEMBLY FOR SERVO-CONTROLLED MAGNETIC TAPE HEAD

[75] Inventors: Adolfo M. Guzman; Paul Y. Hu; Alex I. Panasiuk; Loyal K. Whitted, all of Tucson, Ariz.

[73] Assignee: International Business Machines Corporation, Armonk, N.Y.

[21] Appl. No.: 75,937

[22] Filed: Jun. 14, 1993

[51] Int. Cl.$^5$ .......................... G11B 5/55; G11B 21/02
[52] U.S. Cl. ................................ 360/106; 360/77.12
[58] Field of Search ...................... 360/106, 109, 78.02, 360/77.12, 77.16; 369/44.15

[56] References Cited

U.S. PATENT DOCUMENTS

| | | | |
|---|---|---|---|
| 3,548,392 | 5/1968 | Walstrom et al. | 360/106 |
| 3,836,774 | 9/1974 | Guzman et al. | 250/231 R |
| 4,079,428 | 3/1978 | Toratani | 360/106 |
| 4,131,924 | 12/1978 | Behr et al. | 360/106 |
| 4,185,312 | 1/1980 | Bjordahl | 360/109 |
| 4,212,043 | 7/1980 | Baker | 360/104 |
| 4,363,046 | 12/1982 | Saito | 360/106 |
| 4,538,882 | 9/1985 | Tanaka et al. | 350/255 |
| 4,609,959 | 9/1986 | Rudi | 360/106 |
| 4,677,505 | 6/1987 | Nukada et al. | 360/77 |
| 5,023,861 | 6/1991 | Champagne et al. | 369/215 |
| 5,047,883 | 9/1991 | Aldrich et al. | 360/109 |
| 5,166,848 | 11/1992 | Plachy | 360/109 |
| 5,179,486 | 1/1993 | Kraemer et al. | 360/106 |
| 5,191,492 | 3/1993 | Nayak et al. | 360/78.02 |
| 5,191,495 | 3/1993 | Takahara | 360/106 |
| 5,227,937 | 7/1993 | Magnusson et al. | 360/109 |
| 5,280,402 | 1/1994 | Anderson et al. | 360/106 |

FOREIGN PATENT DOCUMENTS

| | | | |
|---|---|---|---|
| 0390555 | 10/1990 | European Pat. Off. | 360/106 |
| 0477030 | 3/1992 | European Pat. Off. | 360/104 |
| 63-113945 | 5/1988 | Japan | 369/44.15 |

OTHER PUBLICATIONS

IBM Technical Disclosure Bulletin, vol. 26, No. 9, Feb. 1984, pp. 4546-4547.

*Primary Examiner*—A. J. Heinz
*Assistant Examiner*—Brian E. Miller
*Attorney, Agent, or Firm*—D. A. Shifrin

[57] ABSTRACT

An actuator assembly is provided for controlling the position of a multi-track, magneto-resistive transducer to index across tracks in a track seek mode and to rapidly adjust the position of the transducer in a servo controlled track following mode. The actuator includes a base, a beam spaced from the base and movable relative thereto, opposing upper and lower flexures in parallel planes connecting upper and lower portions of the base with upper and lower ends, respectively, of the beam, and an electromagnetic drive means. Each flexure comprises a constraining member fastened to and substantially covering a plate. The constraining member has a plurality of voids formed therein. In one embodiment, the voids comprise parallel openings extending through the constraining member; in another embodiment, the voids define a honeycomb structure; in still another embodiment, the voids define a corrugated structure. Each flexure also has an inner and an outer end, each of which includes a plurality of spaced apart, flexible, necked extensions projecting beyond a central portion of the constraining member. These necked extensions, to which the base and beam are connected, serve as the hinge points of the flexures to maintain the transducer in precise alignment with the tape without significant skewing.

28 Claims, 7 Drawing Sheets

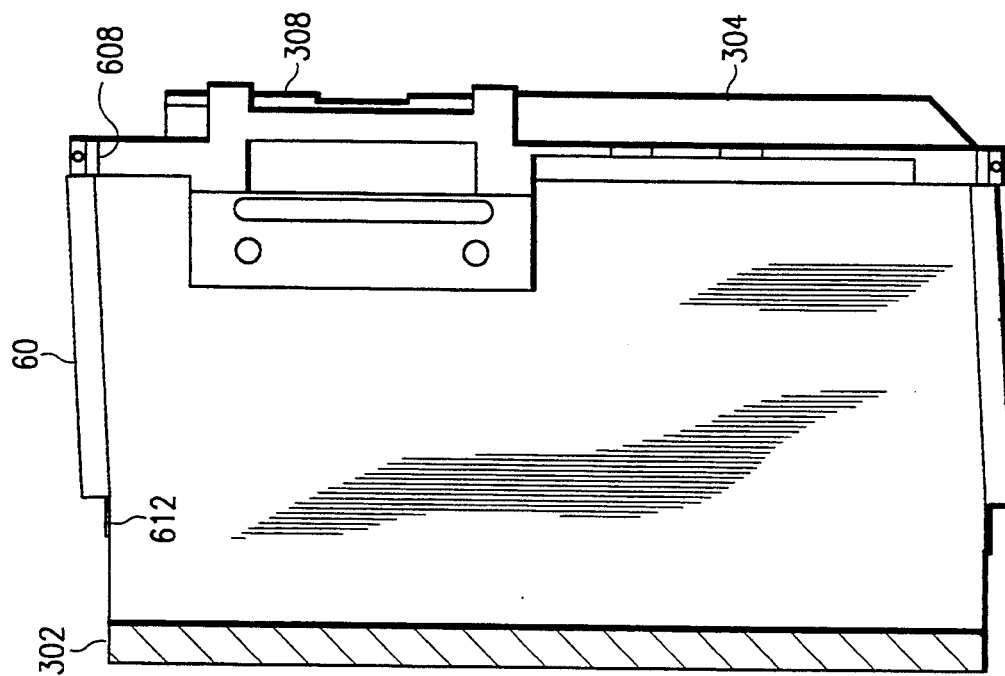
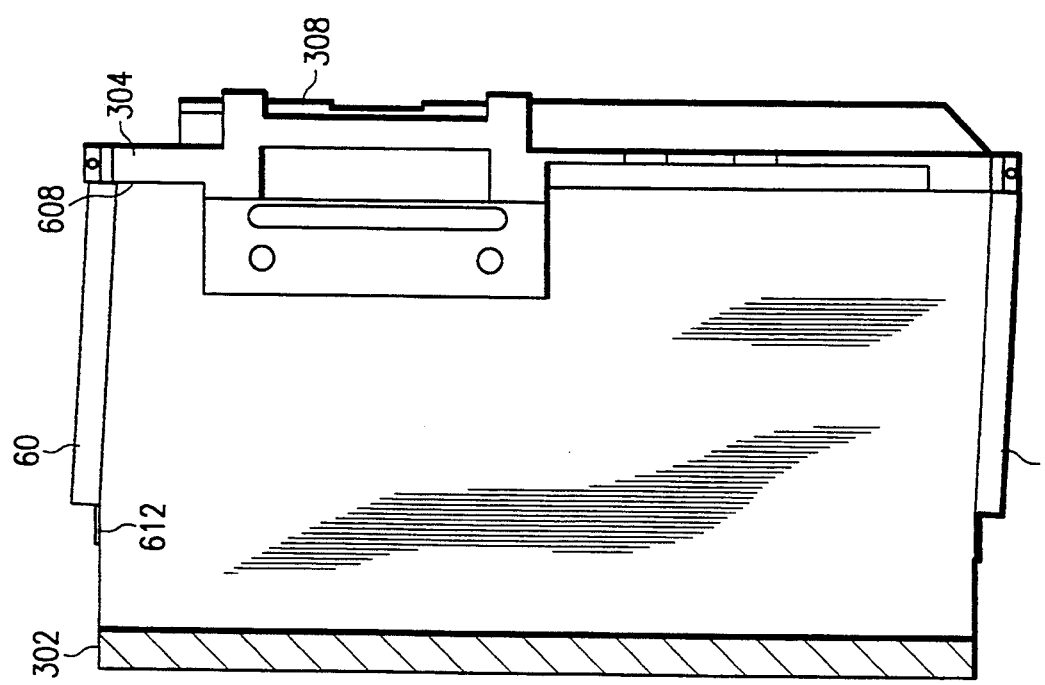

ACTUATOR ASSEMBLY FOR SERVO-CONTROLLED MAGNETIC TAPE HEAD

TECHNICAL FIELD OF THE INVENTION

The present invention relates to magnetic tape head actuators and, in particular, to an actuator assembly to both index a multi-track, magneto-resistive transducer across tracks in a track seek mode and to rapidly adjust the position of the transducer in a servo controlled, track following mode.

BACKGROUND OF THE INVENTION

In the information storage industry, increases in the data capacity of tape have been achieved with thinner tape substrates and with various data compression techniques. Advances in the magnetic tape media and tape head technologies have generated further increases in data capacity by increasing both the number of tracks on a magnetic tape (by narrowing the width of each track) and the number of read/write elements on the head. For example, the IBM 3490-E magnetic tape subsystem for 12.7 mm (½ inch) wide tape employs a head with 36 read/write elements and has a tape capacity of 800 megabytes (MB). 3490-E tape drives perform bi-directional linear recording (as opposed to helical scan recording) and, to reduce the number of tape rewinds and thereby improve performance, sets of head elements are interleaved. In an interleaved head, element pairs having a read-element/write-element configuration (when viewed toward the face of the head) alternate with element pairs having an opposite, write-element/read-element configuration, each pair of elements being associated with one track on the tape. When the tape travels in one direction, the element pairs having one configuration access the corresponding tracks (such as the even numbered tracks) in a read-after-write manner and when the tape travels in the opposite direction, the element pairs having the other configuration access the other corresponding tracks (the odd numbered tracks), also in a read-after-write manner. To further enhance performance with such a large number of tracks requiring an equally large number of closely spaced elements, the tape head of a 3490-E drive is a magneto-resistive transducer formed through thin film deposition techniques.

However, the number of tracks which can be established on the tape media has been limited by the number of elements which could be fabricated on a head to write/read narrower tracks. Therefore, tape drives have been designed to process a tape using a head having fewer sets of read/write elements than there are tracks on the tape. The tracks are divided into groups, each containing the same number of tracks as there are read/write element pairs in the head. To access all of the groups, the head is indexed transversely relative to the tape path, such as with a stepper motor or voice coil driven springs, into a number of discrete positions corresponding to the number of groups of tracks. For example, a head having eight read/write pairs can accommodate a tape having 24 tracks if the tracks are divided into three groups of eight tracks each and the head has three index positions. To reduce the distance the head travels between index positions, the groups are preferably interleaved. In the preceding example, each of three groups contained eight tracks. If tracks are numbered consecutively (0-23), group interleaving results in tracks 0, 3, 6, . . . , and 21 being in the first group and accessible by the head being indexed to position 0. Similarly, tracks 1, 4, 7, . . . and 22 are in the second group, accessible in index position 1, while tracks 2, 5, 8, 23 are in the third group, accessible in index position 2.

Despite such advances in data capacity, still further increases are desired, such as would be possible with a 12.7 mm wide tape having 64 or even 128 tracks. However, even when a head is indexed, there is a practical limit to the ability of a multi-track head to accurately and reliably record data to and read data from a tape having such a large number of very narrow tracks. Problems can be caused by track misregistrations, such as tape edge variations, environmental thermal expansion and contraction and inaccuracies in the path the tape follows in a drive, as well as by inaccuracies in the formatting of tracks on the tape itself. It can be appreciated that even a minute "wobble" in the tape can result in significant signal degradation, such as crosstalk and dropout, if a 12.7 mm tape has 128 tracks, each with a width of about 80 microns.

Consequently, it is desired to provide a tape head actuator capable of indexing a tape head to one of several positions during track seek operations and also rapidly servo controlling the position of the head to precisely follow a track during track accessing operations. It is also desired that the actuator be reliable and relatively simple to manufacture in commercial quantities.

SUMMARY OF THE INVENTION

The present invention provides a tape drive actuator assembly for controlling the position of a multi-track, magneto-resistive transducer to index across tracks in a track seek mode and to servo control the transducer in a track following mode. More particularly, the actuator of the present invention includes a base, a beam spaced from the base and movable relative thereto along a first axis, opposing upper and lower flexures in parallel planes connecting upper and lower portions of the base with upper and lower ends, respectively, of the beam, and an electromagnetic drive means having a keeper, at least one magnet secured to the base and a substantially flat moving coil secured to an inner surface of the beam. The beam includes a support for mounting a magneto-resistive transducer with a face in which are exposed a plurality of paired write and read elements for accessing a multi-track magnetic tape, the tape being movable along a path tangential to the transducer face and perpendicular to the first axis. The coil of the electromagnetic drive means lies in a plane mutually orthogonal to the planes of the flexures and a plane defined by the tape path and the first axis.

Each flexure comprises a constraining member fastened to and substantially covering a plate. The constraining member has a plurality of voids formed therein. In one embodiment, the voids comprise parallel openings extending through the constraining member; in another embodiment, the voids define a honeycomb structure; in still another embodiment, the voids define a corrugated structure. Each flexure also has an inner and an outer end, each of which includes a plurality of spaced apart, flexible, necked extensions projecting beyond a central portion of the constraining member. These necked extensions, to which the base and beam are connected, serve as the hinge points of the flexures to maintain the transducer in precise alignment with the tape without significant skewing.

Preferably, the extensions have a thickness of about 0.1 mm and the flexures have a spring constant of about 0.3 Newtons/mm such that the first natural frequency of the flexures is less than about 30 Hz. and the second natural frequency is greater than about 1000 Hz. Such characteristics enable a magneto-resistive transducer having 32 pairs of read/write elements to accurately follow tracks on a tape having 128 tracks at a servo frequency of about 500 Hz.

The foregoing and other features and advantages of the invention will be apparent from the following more particular description of preferred embodiments of the invention, as illustrated in the accompanying drawings.

BRIEF DESCRIPTION OF THE DRAWINGS

FIGS. 8A and 8B are representative side views illustrating the motion of the flexures and beam of the present invention.

RELATED APPLICATION

This application is related to copending U.S. application Ser. No. 08/075,942, entitled MAGNETIC DRIVE ASSEMBLY TO INDEX AND SERVO A MAGNETIC TAPE HEAD, having common a inventorship, assignee and filing date.

DETAILED DESCRIPTION OF THE INVENTION

Figure 1:
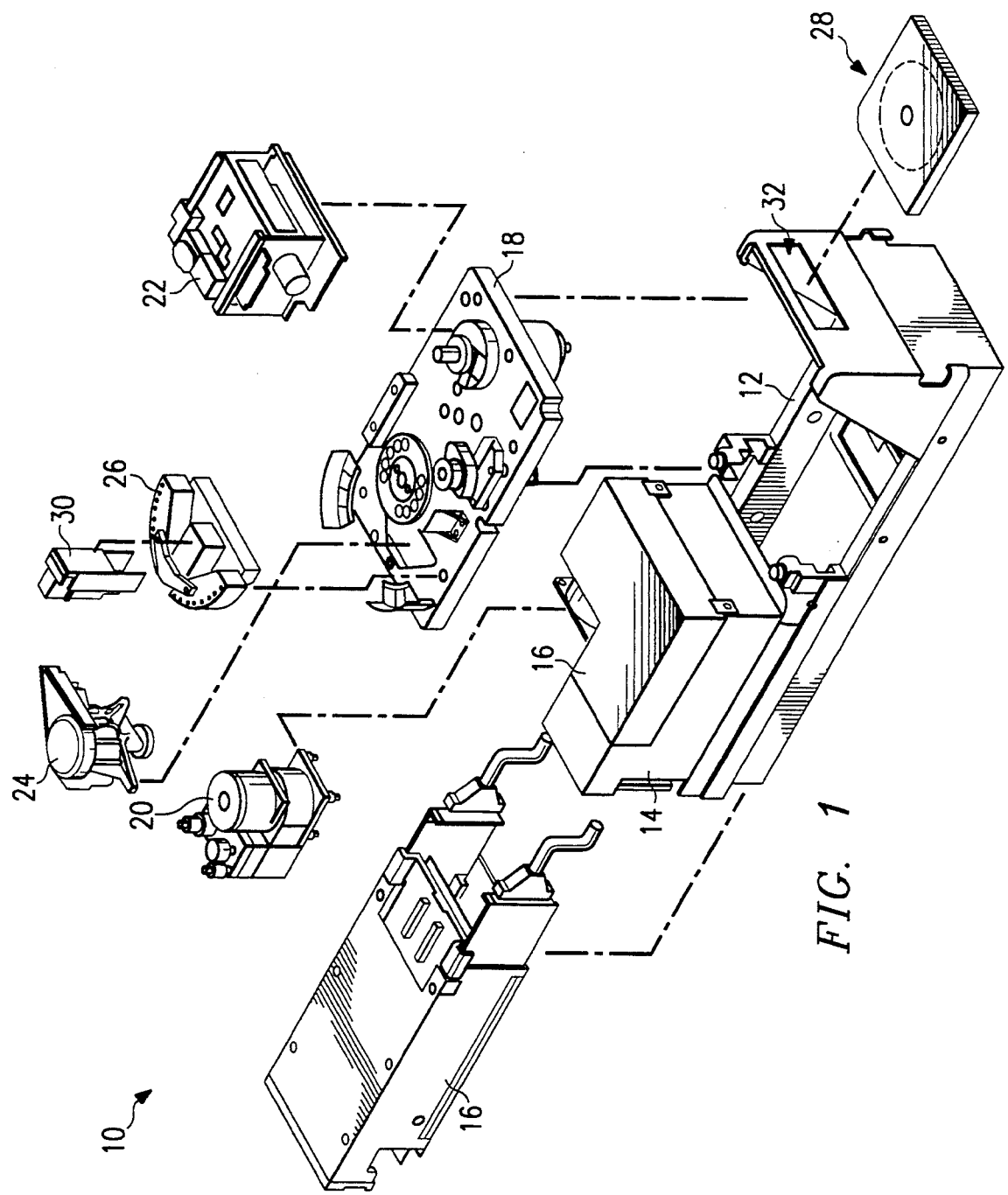
FIG. 1 is an exploded view of a magnetic tape drive of the present invention.

An exemplary magnetic tape drive in which a head actuator assembly of the present invention can be incorporated is illustrated in FIG. 1. The drive 10 comprises a base unit 12 to which are mounted a power supply 14, various electronic circuit cards 16, a deck assembly 18 and a pneumatic assembly 20. Mounted to the deck assembly 18 are a loader mechanism 22, drive motors (not specifically indicated), a pantocam assembly 24 and a "D" bearing assembly 26. A head actuator assembly 30 is mounted to the D bearing assembly 26. The circuit cards 16 include, among others, a drive controller, read/write processors and control and data interfaces. The drive 10 can operate in stand alone and automated tape loader environments interconnected with a host computer and can also be incorporated into a multi-drive automated data storage and retrieval system (library).

For reference purposes, the operation of the drive 10 will be briefly described. A removable tape cartridge 28 having a supply reel wound with magnetic tape is inserted through a slot 32 in the front face of the base unit 12 and into the loader assembly 22. The loader assembly 22 draws the cartridge in and lowers it onto the deck assembly 18. The pantocam assembly 24 engages a leader block attached to the free end of the tape and pulls it around the D bearing assembly 26 such that it lays in a tape path and across a tape head mounted to the head actuator assembly 30. The leader block is then engaged by a take-up reel on the deck assembly 18 and the drive 10 is ready to record information to or read information from the tape. While the tape drive 10 illustrated in FIG. 1 includes a take up reel and accepts tape cartridges containing only the supply reel, the present invention is not limited to use with such a drive/cartridge combination but could also be incorporated in other drive/cartridge combinations, such as those in which the tape cartridge contains both supply and take up reels.

Figure 2B:
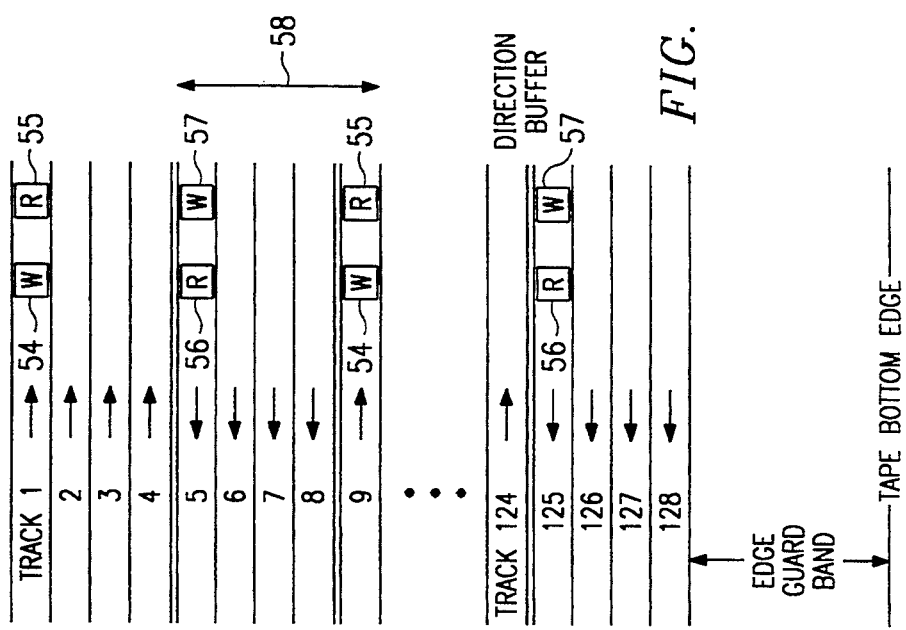
FIGS. 2A and 2B illustrate the track layouts of a tape having 36 recording tracks and of a tape having 128 recording tracks showing representative track widths and head sizes.
Figure 2A:
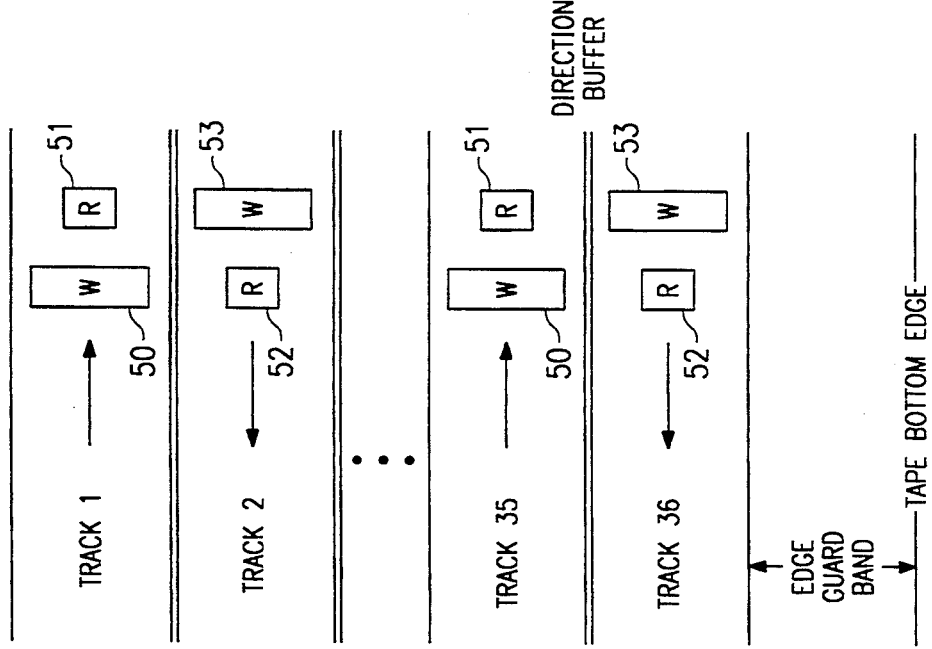

FIG. 2A illustrates the track layout of a typical tape having 36 recording tracks, such as an IBM 3490-E 12.7 mm wide tape. Associated with each track is a pair of read and write elements on a fixed tape head, such as write elements 50 paired with read elements 51, and read elements 52 paired with write elements 53 associated with the odd and even tracks, respectively. When the tape travels from left to right in FIG. 2A, the element pairs 50 and 51 associated with the odd numbered tracks are active for simultaneous recording on those tracks. The tape passes the write elements 50 first which records information onto the tracks and then passes the read elements 51 which reads and verifies the information just-recorded. When the tape travels in the opposite direction, the element pairs 52 and 53 associated with the even numbered tracks are active for simultaneous recording on those tracks in a similar manner. Each read element of such a head has a length of about 195 microns; each track has a width of about 285 microns (the length of each write element being slightly less) with a 30 micron direction buffer between tracks and a 670 micron edge guard band between the edges of the tape and the edges of the first and last tracks.

By contrast, FIG. 2B illustrates the track layout of a tape, also 12.7 mm wide, having 128 recording tracks. Each track has a width of about 80 microns with a 2 micron direction buffer every four tracks and 756 micron edge guard bands. It can be appreciated that the track dimensions represent a significant size reduction, and with increased numbers of tracks results in a corresponding increase in recording capacity, relative to a 3490-E tape system. To attain high performance, it is preferred that the tape head be a thin film magneto-resistive (MR) transducer. Thin film photolithography enables smaller and more closely spaced elements to be formed, thereby increasing the recording capacity by increasing number of tracks on which data can be recorded.

However, the use of such small and closely spaced tracks and elements increases the possibility of undesirable cross-talk. Moreover, it is difficult and expensive to form 128 sets of read/write elements in the transducer, as would be required with a fixed head system, and imperfections in formatting the elements or formatting tracks or the presence of any wobble or other disturbance in the movement of the tape past the transducer could result in interference with information recorded on adjacent tracks. Consequently, it is preferred to form the transducer with fewer sets of elements, space the sets farther apart and move the transducer transversely across the tape path among several index positions in a track seeking mode. In the example illustrated in FIG. 2B, the transducer has 32 pairs of read and write elements and is driven among 4 index positions. The read and write elements are about 35 microns and 79 microns long, respectively. To reduce cross-talk between elements, the element pairs are transversely spaced 4 tracks apart with forward write/read pairs alternating with backward read/write pairs as indicated in FIG. 2B. Thus, when the transducer is in the illustrated first index position, tracks 1, 9, 17, . . . and 121 are recorded and read by sixteen write/read elements 54 and 55 when the tape travels in the forward direction (as indicated by the left to right arrows in the FIG.) and tracks 5, 13, 21, . . . and 125 are recorded and read by sixteen read/write elements 56 and 57 when the tape travels in the reverse direction (as indicated by the right to left arrows). When the transducer indexes to the second position, tracks 2, 10, 18, . . . and 122 are recorded and read by the elements 54 and 55 when the tape travels in the forward direction and tracks 6, 14, 22, . . . and 126 are recorded and read by the elements 56 and 57 when the tape travels in the reverse direction. The remaining tracks are similarly accessed by combining an appropriate transducer index position with an appropriate tape direction.

With such small track and element dimensions, otherwise insignificant track misregistration (TMR) (deviations in the relative track/element alignment) can seriously degrade performance or even prevent recording to or reading from the correct tracks. Consequently, the tape drive 10 includes a servo controlled track following mode to enable the transducer elements to maintain precise alignment with respect to the tape tracks. The tape includes dedicated servo tracks (at least one for each index position) while the transducer includes dedicated servo elements. To precisely follow the servo track under servo control, the head actuator assembly 30 should be capable of driving the transducer reciprocally in the transverse direction, relative to the tape width, very quickly and in very small amounts in response to signals from the servo elements. The present invention can achieve a preferred tracking frequency of about 500 Hz. and a preferred transverse tracking movement, as indicated by the arrow 58, of about ±4 microns or less, with insignificant or no head skew, for accessing information on a 128-track tape.

Figure 3:
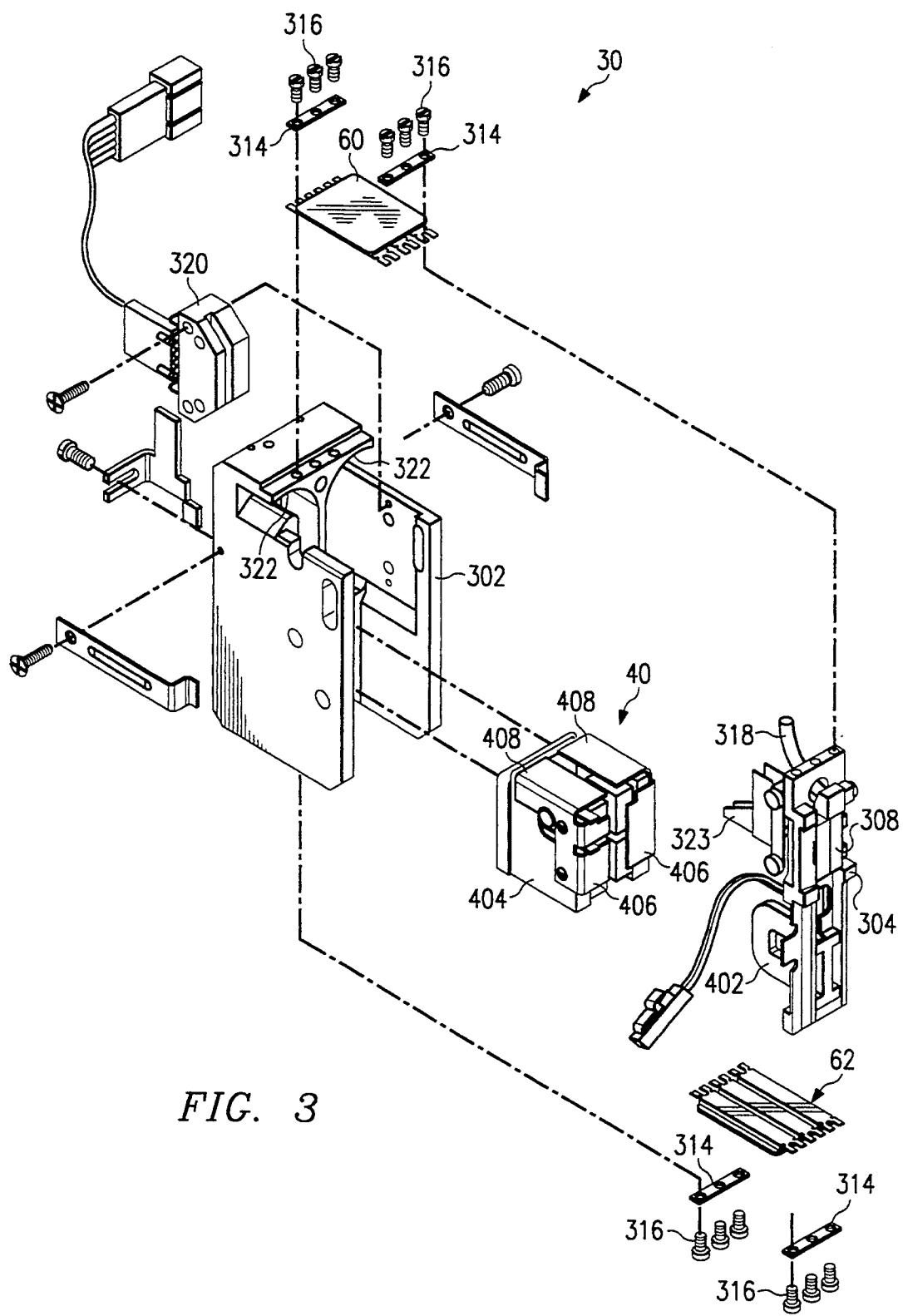
FIG. 3 is an exploded view of the elements of the head actuator assembly of the present invention.
Figure 4:
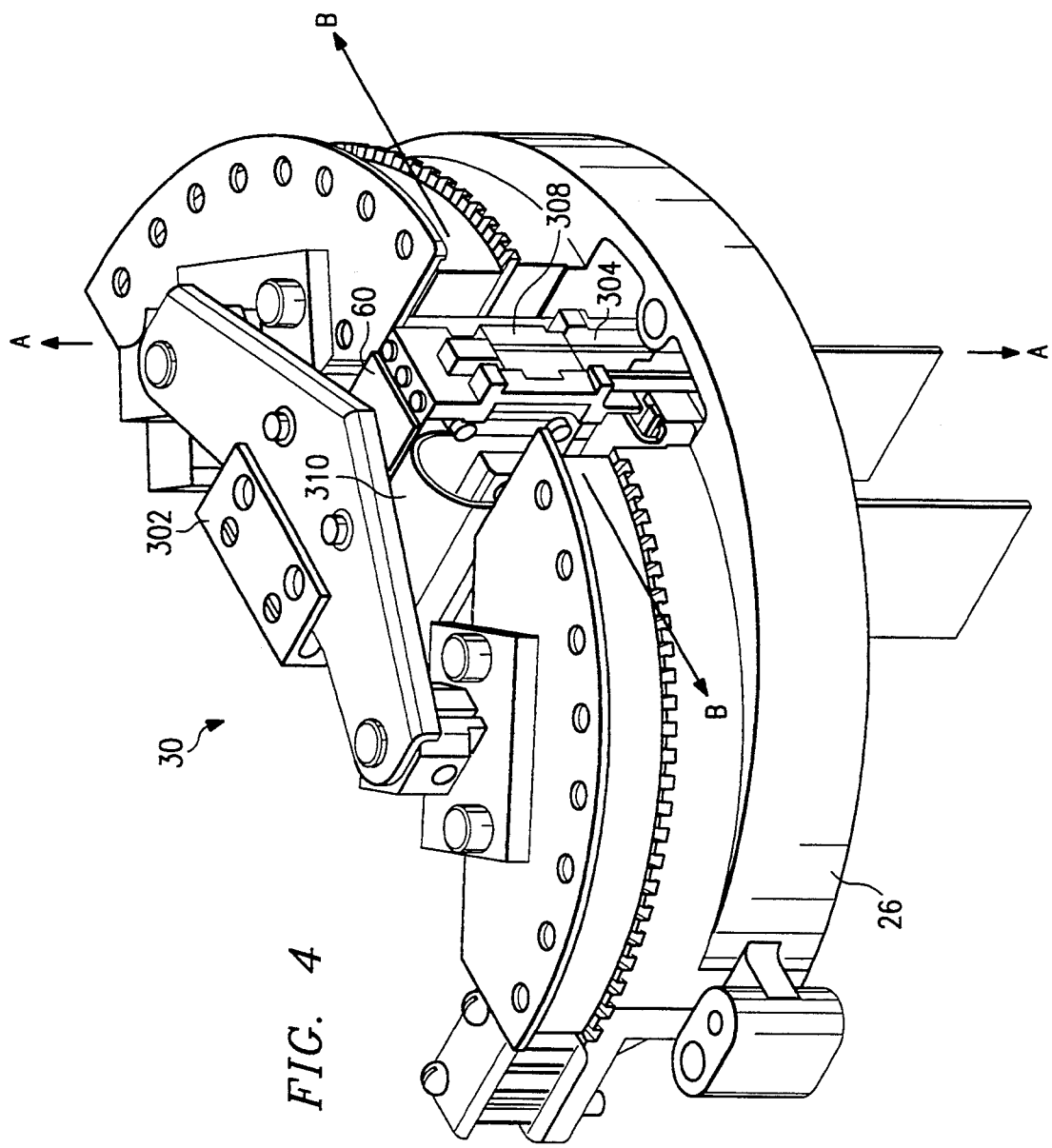
FIG. 4 is a perspective view of a head actuator assembly of the present invention mounted to a "D" bearing assembly of a tape drive.

FIG. 3 is an exploded view of the elements of the head actuator assembly 30 of the present invention and FIG. 4 illustrates the assembled head actuator assembly 30 mounted to the D bearing assembly 26 of the tape drive 10. The actuator assembly 30 comprises a base member 302, a beam member 304 and an electromagnet assembly 40 mounted to the base 302. The electromagnetic assembly 40 includes a keeper 404 and one or more magnets 406. Fastened to the beam 304, but located between the magnets 406 within the magnetic field produced thereby, is a substantially flat electrical coil 402 (as opposed to a cylindrical voice coil coaxial with a yoke). Mounted to the outer surface of the beam 304 is a multi-track MR transducer 308. Interconnecting upper and lower ends of the beam 304 with upper and lower portions of the base 302 are parallel upper and lower flexures 60 and 62, respectively, secured with brackets 314 and screws 316 (although alternative mounting methods can also be used), thereby suspending the beam 304 away from the base 302. A hose 318 is secured to the beam 304 to provide air to outlets in the transducer 308 as a "puffer" device to lift the tape from, and prevent it from sticking to, the surface of the transducer 308 during fast forwarding and rewinding. Also preferably incorporated into the actuator assembly 30 is an optical tachometer to provide beam position feedback to the drive controller during head indexing. The tachometer includes an optical sensor 320 mounted to the base 302 and an associated code strip 323 positioned through a slot in the sensor 320 and which is mounted to, and moves with, the beam 304. Various brackets and screws secure the elements of the actuator assembly 30 together and various cables (including ribbon cables 310 for the transducer 308) interconnect the transducer 308, the coil 402 and the tachometer sensor 320 with the circuit cards 16 of the drive 10. To reduce mechanical interference by the ribbon cables 310 with proper motion of the beam 304, the ribbon cables 310 are preferably guided upwards along the sides of the beam 304 and outwardly from the base 302 by curved surfaces 322 inside the base 302.

In operation, when it is desired to access a particular set of tracks on a tape, the drive controller servo loop circuit supplies a current to the coil 402. The electromagnetic field induced by the coil 402 interacts with the magnetic field of the magnets 406 to generate a force opposing a bias of the flexures 60 and 62 tending to maintain the beam 304 in a primary position. The force urges the beam 304, to which the coil 402 is secured, to move transversely along the axis A—A relative to the tape path (which is indicated by the axis B—B). When the actuator 30 is in a seek or index mode, the magnitude of the current supplied to the coil 402 will be relatively large to produce a relatively large beam displacement across one to three tracks (up to about ±240 microns) and hold the appropriate transducer elements opposite the desired tracks. When the actuator 30 is in a track following mode, the servo loop, responding to position error signals from the servo tracking elements in the transducer 308, makes very small, high frequency adjustments to the coil current to maintain precise transducer/track alignment (with beam movement on the order of about ±4 microns).

In general, flexures or springs connecting the beam 304 with the base 302 should be sufficiently flexible to permit the desired degree of transverse movement to the transducer 308 but should be neither so flexible nor so rigid as to reduce the ability of the servo loop and transducer 308 to rapidly compensate for track misregistration as the tape travels past the transducer 308. Excessively rigid connecting flexures can also require an excessive amount of current through the coil 402 to move the beam 304, leading to stress and possible early failure of the flexures from fatigue. Additionally, the flexures should permit the indexing and tracking motion of the transducer 308 to be maintained substantially linear, without significant skew, such that the beam 304, the base 302 and the flexures represent a parallelogram during such motion. Moreover, the entire actuator assembly 30 should be highly resistant to shock, vibrations and reaction forces which would tend to generate torsional and other undesirable oscillations and motions in the transducer 308, thereby reducing the ability of the transducer 308 to accurately record and reproduce information onto and from the tape.

Figure 5:
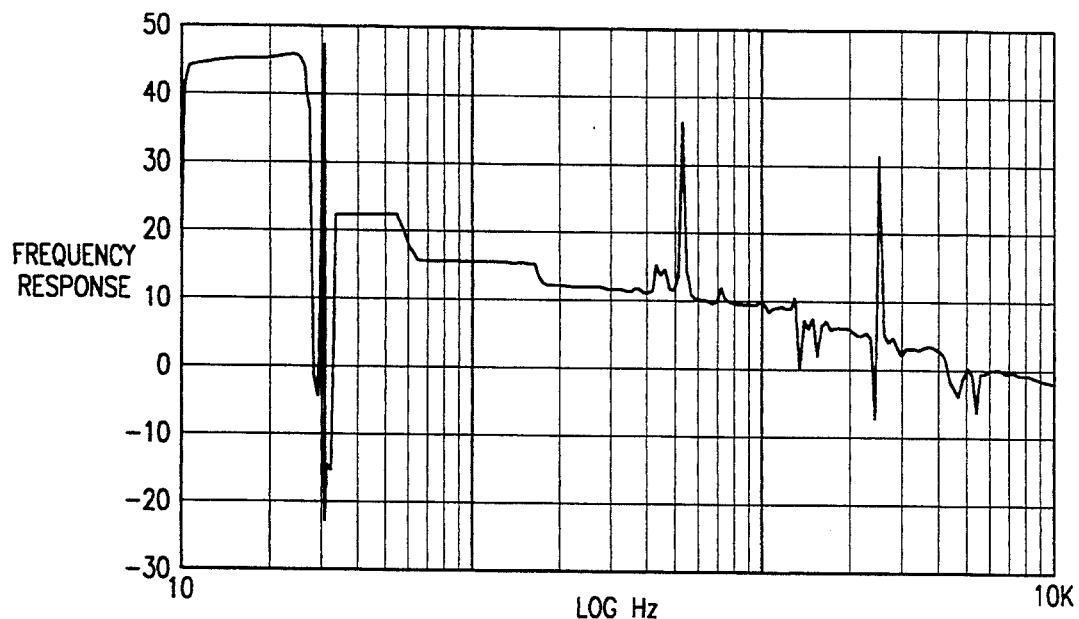
FIG. 5 is a plot of the frequency response of an actuator with conventional leaf springs.

It will be appreciated that if a natural/resonant frequency or vibrational mode of the actuator 30 is close to or within the range of frequencies of operation of the servo loop controlling the motion of the beam 304, an unstable condition can result. FIG. 5 is a frequency response plot of a head actuator assembly with conventional thin, rectangular leaf springs interconnecting a beam and a base. A first natural frequency occurs at about 30 Hz, representing the combined spring/mass system of the actuator, and a second natural frequency occurs at about 500 Hz, representing the spring system alone as if the springs were fixed at each end. As previously described, a tracking frequency of about 500 Hz. is desired for the actuator 30 to accurately follow tracks of a 128-track tape. The 30 Hz. first natural frequency of the conventional spring system represented by FIG. 5 maybe sufficiently low and far from the operating frequency to be compensated or filtered out by the servo loop. However, the 500 Hz. second natural frequency is within the range of servo operating frequencies and cannot, therefore, be compensated or filtered without also degrading necessary information. Consequently, oscillations which interfere with precise tracking can occur.

Additionally, conventional leaf springs are subject to torsional forces which can also interfere with or actually prevent accurate tracking. While stiffening a flexure tends to reduce the first natural frequency, it may not increase resistance to torsional forces and may, as discussed, reduce overall actuator responsiveness and increase the coil current requirement and associated stress. Thinning a flexure tends to increase the second natural frequency but can weaken the flexure and make it more prone to stress and fatigue failure.

The actuator assembly 30 substantially avoids the forgoing drawbacks which make conventional leaf springs unacceptable for use during servo tracking on a tape having a large number of narrow tracks, such as 128 tracks 80 microns wide. To mechanically decouple the actuator assembly 30 from the balance of the tape drive 10 and reduce the adverse effect of external vibrations on the beam 304 and the adverse effect of vibrations from the beam 304 on other components of the drive 10, the base 302 should be fabricated from a massive material. However, to prevent the base 302 from magnetically interacting with the electromagnetic assembly 40 and interfering with the transducer 308, the base 302 should also be non-magnetic. The beam 304 should similarly be non-magnetic but, to increase the responsiveness of the beam 304 and to reduce the amount of current through the coil 402 required to drive the beam 304 and the components attached to it, the beam 304 should be very lightweight. Consequently, it is preferred that the base 302 be fabricated from brass and weigh, for example, about 300 grams and the beam 304 be fabricated from aluminum or magnesium and weigh, for example, less than about 4 grams.

Figure 6A:
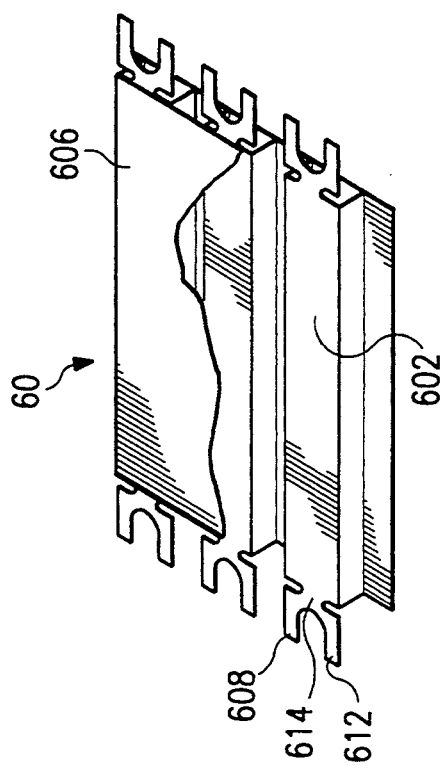
FIGS. 6A and 6B are perspective views of an embodiment of a flexure of the present invention.
Figure 6B:
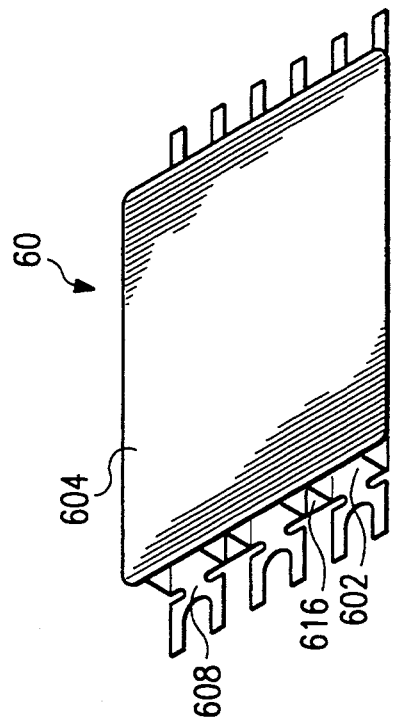

FIGS. 6A and 6B are bottom and top views, respectively, of one embodiment of the upper flexure 60 (the lower flexure 62 being identical). In the embodiment illustrated, the flexure 60 includes a constraining member 602 formed into a corrugated configuration. Openings 616 extend through the constraining member 602 to increase rigidity and resistance to torsional forces and to increase the second natural frequency. For additional strength and rigidity, a top sheet 604 and/or a bottom sheet 606 (shown partially cutaway) can also be included. The top and bottom sheets 604 and 606 are bonded to the constraining member 602, such as with spot welds or adhesive, to prevent movement of any element 602, 604 or 606 relative to any other element.

Figure 7A:
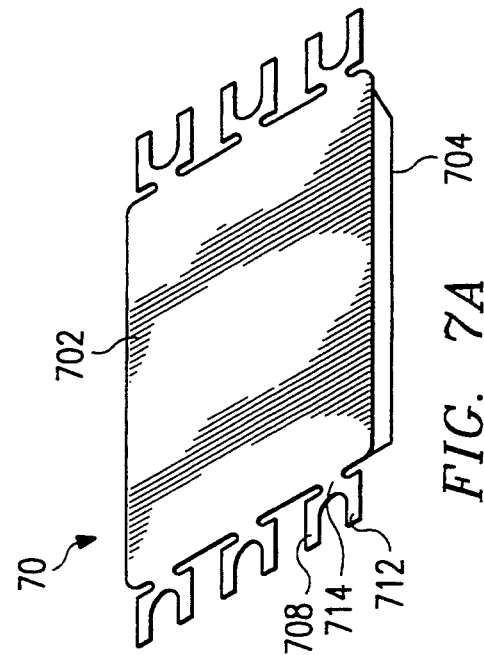
FIGS. 7A and 7B are perspective views of another embodiment of a flexure of the present invention.
Figure 7B:
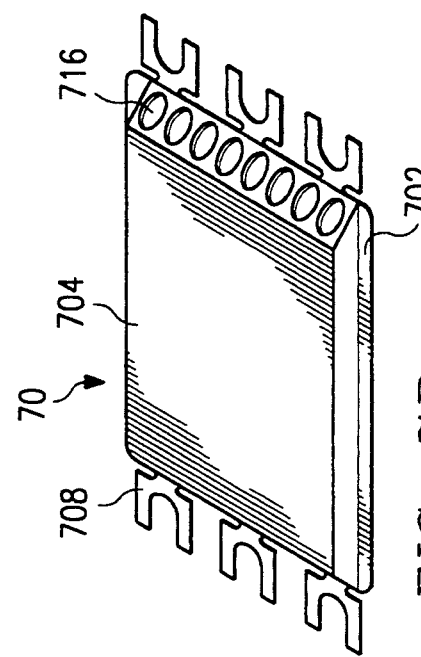

FIGS. 7A and 7B illustrate bottom and top views, respectively, of another embodiment 70 of a flexure of the present invention. The flexure 70 includes a thin flex plate 702 and a rigid, preferably plastic, constraining member 704 bonded to the flex plate 702, such as with adhesive. Holes 716 through the constraining member 704 reduce the weight of the constraining member 704, increasing the second natural frequency and improving its rigidity and resistance to torsional and other undesirable forces. Other hole configurations can be used, as can a honeycomb or cellular configuration formed with numerous voids throughout the constraining member 704.

It has been found that forming the rigid members 602 and 702 with a thickness of about 2 mm provides for satisfactory actuator performance. The rigid member 602 of the first embodiment includes extensions (preferably three) 608 on each end which project beyond the central portion of the rigid member 602. Alternatively, the extensions can be formed as part of either the top or bottom sheets 604 or 606. The flex plate 702 of the second embodiment includes extensions (preferably three) 708 on each end which project beyond the rigid member 704. The extensions 608 and 708 have connecting pads 612 and 712, respectively, for receiving a mounting screw therethrough. Preferably, the connecting pads have a spade-like, open end configuration, as illustrated in the Figs., to facilitate the precise alignment of the beam 304 and to reduce binding, warping and other deformities in the extension when the screw is tightened. However, a closed end configuration can also be used.

Each extension 608 and 708 at the ends of the flexures 60 and 70 also includes a reduced-width, or necked, region 614 and 714. The resulting configuration confines flexing motion of the flexures to the necked portions of the extensions while the balance of each flexure, covered by the constraining member 602 or 702, remains substantially rigid, even when subjected to torsional forces. With each flexure bending only at the necked regions 614 and 714 of the inner and outer ends, the beam 304 is maintained substantially parallel to the base 302 during indexing and track following operations, thereby reducing transducer skew angle, as illustrated in FIGS. 8A and 8B.

Employing necked regions 614 and 714 also permits the second natural frequency to be adjusted without changing the thickness of the extensions. It has been found that reducing the width of the necks 614 and 714 increases the second natural frequency of the actuator assembly 30. Depending upon the material used to form the extensions 614 and 714, good response, strength and fatigue characteristics can be achieved with the following characteristics: an extension length, width and thickness of about 3.5, 3.5 and 0.1 mm, respectively, a neck length and width of about 1.6 and 0.5 mm, respectively, a spring constant K of about 0.3 N/mm and an extension weight of just several milligrams. Moreover, employing more than one, and preferably three, extensions on each end of each flexure improves torsional resistance. The use of four or more extensions, however, presents manufacturing difficulties without appreciably improving performance.

The type of material chosen for the flexures 60 and 70 also affects their performance. Beryllium copper is a preferred material, having very good fatigue strength properties and a substantially linear force/deflection relationship, even at very small deflections (such as 4 microns and less). Moreover, beryllium copper is substantially transparent to magnetic flux and will not deflect or concentrate flux leakage from the electromagnetic assembly 40 towards the MR transducer 308. Blue temper (spring) steel also performs adequately, as does 303 stainless steel, although the latter exhibits some non-linearity (i.e., softer than normal behavior) during deflections of less than about 80 microns.

Figure 9:
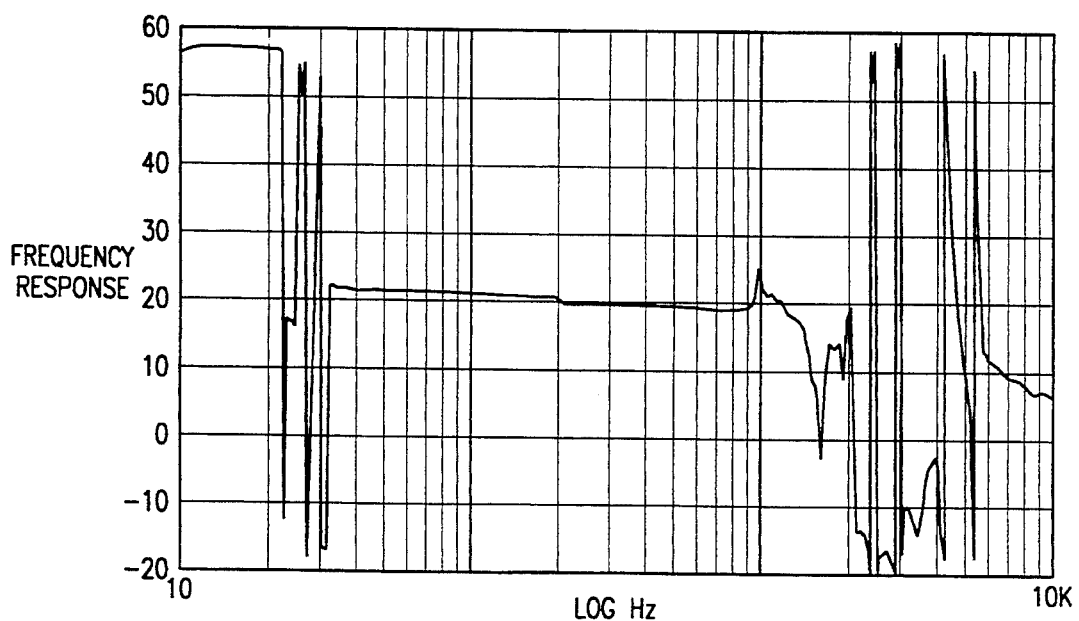
FIG. 9 is a plot of the frequency response of a flexure of the present invention.

FIG. 9 is a frequency response plot of the head actuator assembly 30 with flexures 60 or 70 of the present invention interconnecting the beam 304 and the base 302. A first natural frequency occurs at about 20 Hz., representing the spring/mass system of the actuator 30, and a second natural frequency occurs at about 1150 Hz., representing the flexure system alone. The 20 Hz. first natural frequency is sufficiently low and far from the operating frequency to be compensated or filtered by the servo loop. And, the 1150 Hz. second natural frequency of the actuator 30 is sufficiently outside the range of operating frequencies of the servo system that it can be adequately compensated and not significantly interfere with indexing and servo tracking. Consequently, oscillations which would otherwise interfere with precise tracking have been substantially reduced or eliminated.

While the invention has been particularly shown and described with reference to preferred embodiments thereof, it will be understood by those skilled in the art that various changes in form and details may be made therein without departing from the spirit and scope of the invention.

What is claimed is:

1. A servo controlled magnetic tape head actuator assembly for an indexing and track-following tape head, comprising:
  a massive, non-magnetic base member;
  a magneto-resistive transducer having an outer face with a plurality of paired write and read elements for accessing tracks of a multitrack magnetic tape, the tape movable along a tape path across said paired write and read elements perpendicular to said first axis, said tape path and said first axis defining a first plane; a lightweight, non-magnetic beam member spaced from said base member and reciprocatingly movable relative thereto along a first axis, said beam member including a support mounting said magneto-resistive transducer to an outer surface of said beam member,
  opposing upper and lower flexures in parallel second planes, each flexure comprising a constraining member having a plurality of voids formed therein and being fastened to and substantially covering a flexure plate with inner and outer ends, each end having a plurality of spaced apart flexible necked extensions projecting beyond said constraining member, said flexible necked extensions on said inner ends of said upper and lower flexures being connected respectively to upper and lower portions of said base member and said extensions on said outer ends of said upper and lower flexures being connected respectively to upper and lower ends of said beam member; and
  an electromagnetic drive means having a keeper secured to said base member, a magnet secured to said keeper, and a substantially flat moving coil in a plane orthogonal to said first and second planes and secured to an inner surface of said beam member, said electromagnetic drive means being contained within a volume substantially defined by said upper and lower flexures, said base member and said beam member.

2. The assembly of claim 1, wherein said plurality of voids formed within said constraining member comprise a plurality of openings extending therethrough parallel to a second axis normal to said first plane.

3. The assembly of claim 2, wherein said plurality of openings define a corrugated structure.

4. The assembly of claim 1, wherein said plurality of voids formed within said constraining member define a honeycomb structure.

5. The assembly of claim 1, wherein said flexible extensions have a thickness of about 0.1 mm.

6. The assembly of claim 1, wherein said flexures have a spring constant of about 0.3 N/mm.

7. The assembly of claim 1, wherein said flexures have a first natural frequency less than about 30 Hz.

8. The assembly of claim 7, wherein said flexures have a second natural frequency greater than about 1150 Hz.

9. The assembly of claim 1, wherein:
  during a track indexing operation, said electromagnetic drive means drives said beam member along said first axis in steps of about 80 microns; and
  during a track following operation, said electromagnetic drive means drives said beam member within the range of about −4 microns to about +4 microns along said first axis.

10. The assembly of claim 1, wherein the magneto-resistive transducer comprises 32 paired write and read elements and during an indexing operation said electromagnetic drive means drives said beam member along said first axis among 4 index positions in steps of about 80 microns, said electromagnetic drive means further having a maximum stroke length of about ±1 mm.

11. The assembly of claim 1, wherein the number of flexible necked extensions at each of said inner and outer ends of said flexure plates is three.

12. The assembly of claim 11, wherein each of said flexible necked extensions includes an open connecting pad at the end thereof.

13. The assembly of claim 1, wherein said base member is brass and said beam member is a material selected from the group comprising aluminum and magnesium.

14. The assembly of claim 1, wherein said flexures are formed from beryllium copper.

15. The assembly of claim 1, wherein said magneto-resistive transducer is mounted to said beam between said parallel second planes.

16. A multitrack, linear recording, magnetic tape drive, comprising:
  a magneto-resistive transducer having an outer face with a plurality of paired write and read elements for accessing tracks of a multitrack magnetic tape, said outer face defining a first plane;
  means for driving the magnetic tape in a path across said plurality of paired elements;
  means for transmitting signals to and receiving signals from said magneto-resistive transducer whereby information is recorded on and read from the magnetic tape;
  an actuator assembly for imparting reciprocating motion to said magneto-resistive transducer in a direction transverse to the tape path, said actuator assembly comprising:
    a non-magnetic base member;
    a non-magnetic beam member spaced from said base member and reciprocatingly movable relative thereto in said transverse direction, said magneto-resistive transducer being mounted to an outer surface of said beam member;

opposing upper and lower flexures in parallel second planes, each flexure comprising a constraining member having a plurality of voids formed therein and being fastened to and substantially covering a flexure plate with inner and outer ends, each end having a plurality of spaced apart flexible necked extensions projecting beyond said constraining member, said flexible necked extensions on said inner ends of said upper and lower flexures being connected respectively to upper and lower portions of said base member and said extensions on said outer ends of said upper and lower flexures being connected respectively to upper and lower ends of said beam member;

an electromagnetic drive means having a secured to said base member, a magnet structure secured to said keeper and a substantially flat moving coil positioned in a plane orthogonal to said first and second planes and secured to an inner surface of said beam member, said electromagnet drive means contained within a volume substantially defined by said upper and lower flexures, said base member and said beam member; and control means for controlling a current in said coil during track indexing and track following operations.

17. The drive of claim 16, wherein said plurality of voids formed within said constraining member comprise a plurality of openings extending therethrough parallel to a second axis normal to said first plane.

18. The drive of claim 17, wherein said plurality of openings define a corrugated structure.

19. The drive of claim 17, wherein said flexure plate has a thickness of about 0.1 mm and a spring constant of about 0.3 N/mm.

20. The drive of claim 19, wherein:

said control means controls the current in said coil at a frequency of about 500 Hz. during track following operations; and said flexures have a first natural frequency less than about 30 Hz and a second natural frequency greater than about 1150 Hz.

21. The drive of claim 16, wherein:

said magneto-resistive transducer comprises 32 paired write and read elements for linearly accessing 128 tracks on the magnetic tape;

said electromagnetic drive means said beam member in said transverse direction in steps of about 80 microns during a track indexing operation; and said electromagnetic drive means drives said beam member within the range of about −4 microns to about +4 microns in said transverse direction during a track following operation.

22. The drive of claim 16, wherein the number of flexible necked extensions at each of said inner and outer ends of said plates is three and each of said extensions includes an open connecting pad at the end thereof.

23. The drive of claim 16, further comprising an optical tachometer having a code strip secured to said beam member and an optical sensor secured to said base member for sensing changes in the position of said code strip in said transverse direction.

24. In a servo-controlled, track following tape head actuator assembly having a base, a movable beam spaced from the base and having a magneto-resistive transducer mounted thereto, and an electromagnetic drive assembly with a keeper secured to the base, a magnet secured to the keeper and a flat moving coil within a magnetic field of the magnet and secured to the beam, the improvement comprising:

opposing upper and lower flexures in parallel first planes, each flexure comprising a constraining member having a plurality of parallel openings formed therethrough and being fastened to and substantially covering a flexure plate with inner and outer ends, each end having a plurality of spaced apart flexible necked extensions projecting beyond said constraining member, said flexible necked extensions on said inner ends of said upper and lower flexures being connected respectively to upper and lower portions of said base and said extensions on said outer ends of said upper and lower flexures being connected respectively to upper and lower ends of said beam.

25. The actuator assembly of claim 24, wherein said flexure plate has a thickness of about 0.1 mm and a spring constant of about 0.3 N/mm.

26. The assembly of claim 25, wherein said flexures have a first natural frequency less than about 30 Hz and a second natural frequency greater than about 1150 Hz.

27. The assembly of claim 24, wherein:

during a track indexing operation, the electromagnetic assembly drives the beam in steps of about 80 microns; and during a track following operation, the electromagnetic assembly drives said beam within the range of about −4 microns to about +4 microns.

28. The assembly of claim 24, wherein the number of flexible necked extensions at each of said inner and outer ends of said flexure plates is three.

* * * * *